(12) United States Patent
Jan et al.

(10) Patent No.: US 9,490,465 B2
(45) Date of Patent: *Nov. 8, 2016

(54) Z-SHAPED BUS BAR FOR A BATTERY PACK (71) Applicant: Atieva, Inc., Redwood City, CA (US)

(72) Inventors: James Jan, Fremont, CA (US);
Richard J. Biskup, Sunnyvale, CA (US); Benson Tsai, Mountain View, CA (US); Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/203,874

(22) Filed: Mar. 11, 2014

(65) Prior Publication Data

US 2014/0255750 A1    Sep. 11, 2014

Related U.S. Application Data

(63) Continuation-in-part of application No. 13/794,535, filed on Mar. 11, 2013.

(51) Int. Cl.
*H01M 2/20* (2006.01)
*H01M 2/10* (2006.01)
*H01M 10/643* (2014.01)
*H01M 10/655* (2014.01)
*H01M 10/613* (2014.01)

(52) U.S. Cl.
CPC ........... *H01M 2/206* (2013.01); *H01M 2/1077* (2013.01); *H01M 10/613* (2015.04); *H01M 10/643* (2015.04); *H01M 10/655* (2015.04)

(58) Field of Classification Search
CPC ... H01M 2/202; H01M 2/206; H01M 2/1077
USPC ........................................................ 429/158
See application file for complete search history.

(56) References Cited

U.S. PATENT DOCUMENTS

| | | | |
|---|---|---|---|
| 8,932,741 B2 | 1/2015 | Eberhard et al. | |
| 8,945,747 B2 | 2/2015 | Eberhard et al. | |
| 2012/0141852 A1* | 6/2012 | Eberhard | H01M 2/1077 429/98 |
| 2012/0164490 A1* | 6/2012 | Itoi | H01M 2/105 429/7 |

* cited by examiner

*Primary Examiner* — Nicholas P D'Aniello
(74) *Attorney, Agent, or Firm* — Patent Law Office of David G. Beck (57) ABSTRACT

A battery pack with a compact and robust bus bar assembly is provided. The batteries within the pack are divided into groups, where the batteries within each battery group are connected in parallel and the groups are connected in series. A repetitive sequence of overlapping bus bars is used, with each bus bar comprised of upper and lower segments coupled together via a step segment. The overlapping design allows the upper surface of the upper segment of each of the repetitive bus bars to be aligned within an upper plane, and the lower surface of the lower segment of each of the repetitive bus bars to be aligned within a lower plane.

15 Claims, 6 Drawing Sheets

Z-SHAPED BUS BAR FOR A BATTERY PACK

CROSS-REFERENCE TO RELATED APPLICATION

This application is a continuation-in-part of U.S. patent application Ser. No. 13/794,535, filed 11 Mar. 2013, the disclosure of which is incorporated herein by reference for any and all purposes.

FIELD OF THE INVENTION

The present invention relates generally to battery packs and, more particularly, to a robust and compact design for a battery pack bus bar.

BACKGROUND OF THE INVENTION

A bus bar is a metal strip or bar that conducts electricity and is used for electrical power distribution. Battery cells can be connected with bus bars to make battery packs. Some battery packs using cylindrical cells make electrical connections to the tops and the bottoms of the cells. When connecting cells in series, bus bars and high current interconnects link the positive terminal of one cell, or a parallel group of cells, to the negative terminal of the next cell or the next parallel group of cells. Unfortunately, connections to the bottoms of the cells may prevent the efficient operation of either an air-based or a liquid coolant-based cooling system that is being used to remove the heat generated by the cells during operation. In addition, the high current interconnect from the bottoms of the cells to the bus bars, which may be in the form of a wire somewhat longer than the length of the cell, introduces a small amount of resistance which gives rise to a voltage drop at high current levels. Furthermore, assembly of this wire to the bus bars and/or to the bottom of each of the batteries adds to the manufacturing cost of the battery pack while potentially introducing reliability issues.

Accordingly, what is needed is a robust bus bar that allows the efficient assembly of a battery pack system while not affecting operation of the battery pack thermal management system. The present invention provides such a bus bar design.

SUMMARY OF THE INVENTION

The present invention provides a robust and compact bus bar assembly for use in a battery pack, where the battery pack includes a plurality of batteries divided into a plurality of battery groups, where each battery group is comprised of a subset of the plurality of batteries, where each subset of batteries is electrically connected in parallel, and where the battery groups are electrically connected in series. Each battery is comprised of a first terminal and a second terminal at the first end of the battery. The bus bars are positioned proximate the first end of each of the batteries. Each battery of each subset of batteries is electrically connected via its first terminal to a first bus bar segment of one bus bar and via its second terminal to a second bus bar segment of an adjacent bus bar.

In one aspect, each bus bar of the plurality of bus bars includes both a first bus bar segment and a second bus bar segment. The bus bars may be arranged in a repetitive sequence such that a first bus bar segment of one bus bar overlaps a second bus bar segment of an adjacent bus bar, and where an electrically insulating layer is interposed between the first bus bar segment of the one bus bar and the second bus bar segment of the adjacent bus bar. The upper surface of the first bus bar segment of the one bus bar may be coplanar with the upper surface of the first bus bar segment of the adjacent bus bar. Each bus bar may include a stepped segment interposed between the first and second bus bar segments, where the upper surface of the first bus bar segment and the upper surface of the second bus bar segment are non-coplanar.

In another aspect, each of the batteries comprising the plurality of batteries may be cylindrical, for example utilizing an 18650 form factor. The first terminal of each of the batteries may be comprised of the battery positive terminal while the second terminal of each of the batteries may be comprised of the battery casing.

In another aspect, the first bus bar segment of each bus bar may be comprised of a plurality of contact fingers. A plurality of wire bonds may electrically contact the first terminal of each battery of each subset of the batteries to the corresponding contact finger of the corresponding first bus bar segment. The wire bonds may be coupled to the first terminal of each battery of each subset of the batteries and to the corresponding contact finger of the plurality of contact fingers using a bonding technique selected from the group consisting of ultrasonic bonding, resistance bonding, thermocompression bonding and thermosonic bonding.

In another aspect, the second bus bar segment of each bus bar may be comprised of a plurality of apertures. The plurality of apertures within the second bus bar segment of each bus bar may be sized to accommodate the first end portion of a corresponding battery of the plurality of batteries. The batteries may be cylindrical, for example utilizing an 18650 form factor, and the plurality of apertures may be circular. A plurality of wire bonds may electrically contact the second terminal of each battery of each subset of the batteries to the corresponding second bus bar segment. The wire bonds may be coupled to the second terminal of each battery of each subset of the batteries and to the corresponding second bus bar segment using a bonding technique selected from the group consisting of ultrasonic bonding, resistance bonding, thermocompression bonding and thermosonic bonding.

In another aspect, the battery pack may further comprise a first battery pack output terminal electrically connected to the first terminal of the first subset of the plurality of batteries, and a second battery pack output terminal electrically connected to the second terminal of the last subset of the plurality of batteries.

In another aspect, a thermal management system, e.g., a heat sink and/or at least one cooling conduit, may be thermally coupled to a second end portion of each battery of the plurality of batteries.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
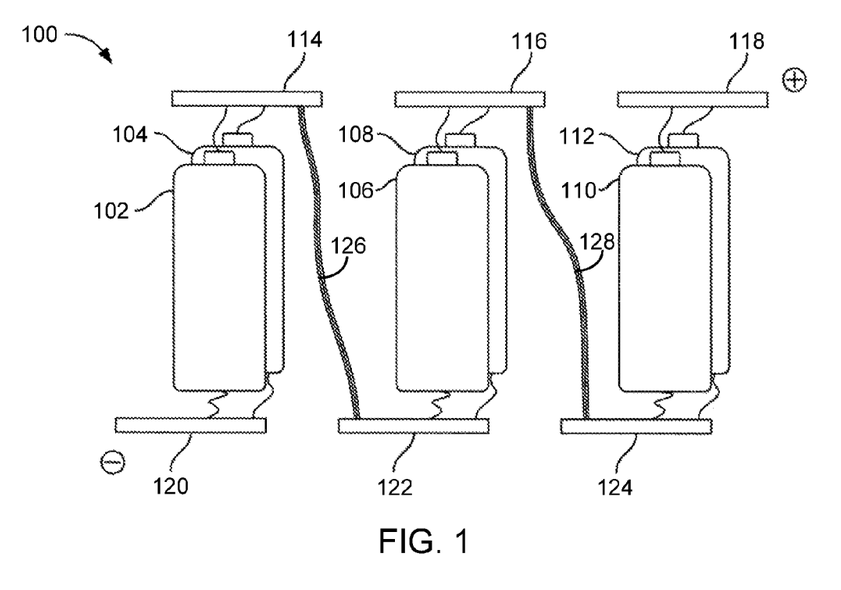
FIG. 1 is a schematic diagram of a battery pack with bus bars above and below the battery cells.

FIG. 1 illustrates a battery pack 100 that uses bus bars above and below the battery cells, thereby limiting the ability to remove heat generated by the cells of the battery pack. Within battery pack 100 is a first group of batteries 102 and 104 connected in parallel, a second group of batteries 106 and 108 connected in parallel, and a third group of batteries 110 and 112 connected in parallel. The first, second and third groups of batteries are connected in series. Bus bars 114, 116, 118, 120, 122, 124 are used to connect the batteries in this parallel and series coupling. Each of the bus bars is coupled to the respective batteries with one or more wires. A relatively thick wire 126 couples the second bus bar 114 to the third bus bar 122, making a series connection between the first and second battery groups, while a second relatively thick wire 128 couples the fourth bus bar 116 to the fifth bus bar 124, making a series connection between the second and third battery groups. As a result, the first bus bar 120 is the negative terminal while the sixth bus bar is the positive terminal for battery pack 100.

The use of bus bars at both ends of the batteries as illustrated in FIG. 1 limits the area where a heat sink can be affixed to either end in order to achieve efficient heat removal. Additionally, soldering or otherwise connecting the relatively thick wire (e.g., wires 126 and 128 in FIG. 1) from an upper bus bar to a lower bus bar adds assembly complexity, and thus cost, to such a battery pack. Wires 126 and 128 can also introduce parasitic resistance into the current path, which in turn can introduce a voltage drop under high current drain conditions. Lastly, wires 126 and 128 are subject to breakage, resulting in short circuits, open circuits, or other reliability problems.

Figure 2:
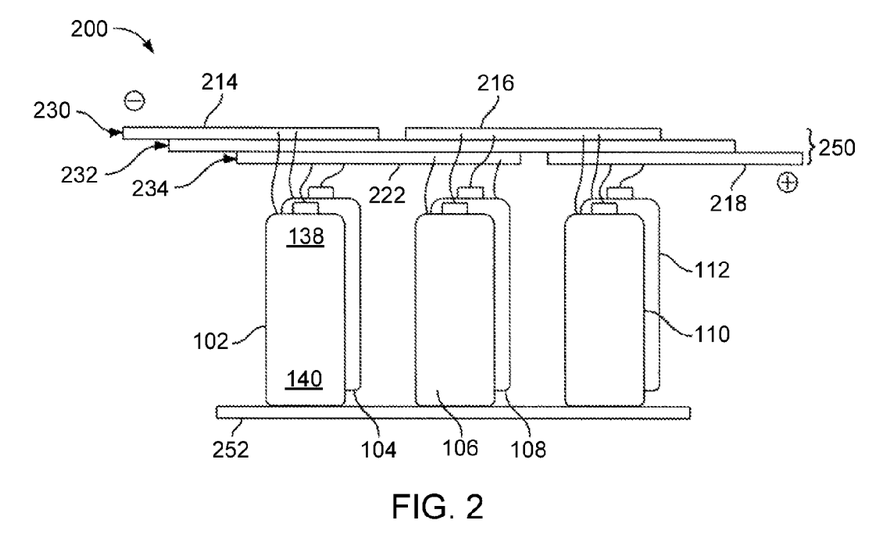
FIG. 2 is a schematic diagram of a battery pack with bus bars adjacent to the positive terminals of the battery cells.

FIG. 2 illustrates a battery pack 200 with a bus bar arrangement in which all the bus bars are proximate to one end of the battery pack, thus enabling efficient heat removal from the other end of the battery pack. Additionally, by locating bus bars 214, 216, 218 and 222 proximate to one end of the battery cells, fewer bus bars are required than in battery pack 100. The relatively thick wires 126 and 128 from the upper bus bars to the lower bus bars are also eliminated in the embodiment shown in FIG. 2.

Access to both the positive and negative terminals in battery pack 200 is at one end of the cells, i.e., at the top end of the cells, where the bus bars are coupled to the positive and negative terminals using wires. One of the benefits of this approach is that the wires are shorter in length than any of the battery cells. As shown in FIG. 2, the first group of batteries 102 and 104 are connected in parallel, the second group of batteries 106 and 108 are connected in parallel, and the third group of batteries 110 and 112 are connected in parallel. The first, second and third groups of batteries are connected in series. Bus bars 214, 216, 218, 222 are used to couple the batteries in this parallel and series arrangement. Specifically, starting with the negative terminal of battery pack 200, a first bus bar 214 is connected to the negative terminals of the first group of batteries 102 and 104 while a second bus bar 222 is connected to the positive terminals of the same group of batteries 102 and 104, both at the top end portion 138 of each of the batteries. The first and second bus bars 214 and 222 couple the first group of batteries 102 and 104 in parallel. Similarly, the second bus bar 222 and the third bus bar 216 couple the second group of batteries 106 and 108 in parallel, while the third bus bar 216 and the fourth bus bar 218 couple the third group of batteries 110 and 112 in parallel. Series connections between battery groups are formed by the bus bars, specifically the second bus bar 222 connects the positive terminals of the first group of batteries 102 and 104 to the negative terminals of the second group of batteries 106 and 108; and the third bus bar 216 connects the positive terminals of the second group of batteries 106 and 108 to the negative terminals of the third group of batteries 110 and 112. The fourth bus bar 218 is the positive terminal of the battery pack 200. It should be understood that other bus bar configurations utilizing various combinations of parallel and serial connections may be used without departing from the approach of making all connections to the top portions of each of the batteries.

In battery pack 200, the bus bars are arranged in a layer stack 250, although other configurations may be used such as those described below. In layer stack 250, the first bus bar 214 and the third bus bar 216 are placed in a first layer 230, and are separated by a gap to prevent short circuiting. In some embodiments the gap is filled with an insulator. An insulator is disposed as the second layer 232. The second bus bar 222 and the fourth bus bar 218 are placed in a third layer 234, and are separated by a gap or insulator to prevent short circuiting. The third layer 234 is separated from the first layer 230 by the electrically insulating second layer 232 to prevent short circuiting. It should be understood that layer stack 250 is simply an exemplary stack and that alternate stack configurations are possible. For example, the layer stack may have more than three layers and each bus bar layer may have a single bus bar or two or more bus bars disposed within a single co-planar layer.

Batteries 102-112 have a projecting nub as a positive terminal at the top end of the cell and a can or casing that serves as the negative cell terminal. In the preferred and illustrated embodiment, the casing has a relatively flat bottom surface with cylindrical sides. Typically a portion of the negative terminal is located at the top end of the cell, for example due to a casing crimp which is formed when the casing is sealed around the contents of the battery cell. This crimp or other portion of the negative terminal at the top end of the cell provides physical and electrical access at the top end to the negative terminal of the battery. The crimp is spaced apart from the peripheral sides of the projecting nub through a gap that may or may not be filled with an insulator.

In one embodiment, the layer stack is formed using layers of a circuit board. For example, the bus bars can be made of (or on) copper layers or another suitable conductive metal and the insulator can be made of resin impregnated fiberglass or other suitable electrically insulating material. Alternately, the bus bars can be made of aluminum or other electrically conductive material with any of a variety of electrically insulating material applied as an insulating layer.

In battery pack 200, a heat sink 252 is thermally coupled to the bottom end portions 140 of each of the batteries, i.e., cells 102, 104, 106, 108, 110 and 112. The heat sink may be finned or utilize air or liquid coolant passages. In some embodiments, a fan provides air flow across a surface of heat sink 252. In at least one embodiment, the heat sink is attached or affixed to the bottom of a battery holder, such as the battery holder shown in FIG. 4. The co-planar arrangement of the batteries provides a relatively flat surface to attach a heat sink and in some embodiments the battery cells are designed to cool efficiently through the bottom of the cells, e.g., 18650 lithium ion batteries.

Figure 3:
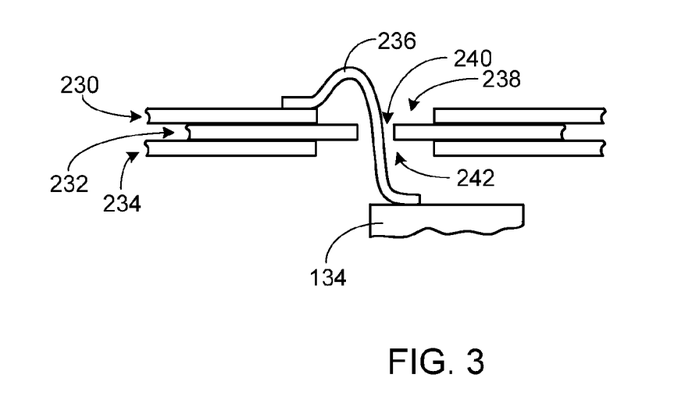
FIG. 3 is a detailed cross-sectional view of the bus bars in a layer stack in a manner similar to that shown in FIG. 2.

One way of routing wires connecting the bus bars to the battery cell terminals is shown in FIG. 3. The connecting wires, as shown in FIG. 2, can be significantly shorter than the length of a battery cell, and are thus shorter and less resistive than wires connecting from overhead bus bars to the bottoms of the battery cells as shown in FIG. 1. In FIG. 3, each of the materials in the layer stack has an aperture, and the sizes of the apertures are arranged so that a bond wire 236 is less likely to short out to one of the bus bars. In the exemplary embodiment, a bus bar on the first layer 230 of the layer stack has an aperture 238 through which the bond wire 236 passes. An insulator on the second layer 232 of the layer stack has a smaller aperture 240 through which bond wire 236 passes. A bus bar on the third layer 234 of the layer stack has a larger aperture 242 through which bond wire 236 passes. The smaller aperture 240 of the insulator, i.e., second layer 232, constrains motion of the bond wire 236 so that the bond wire 236 is less likely to contact edges of larger apertures 238 or 242. In other words, the bond wire 236 is less likely to contact the bus bars of the first and third layers as a result of the staggered aperture sizes. Bond wire 236 couples the bus bar on the first layer 230 to a surface 134 of the battery, e.g., a positive or negative terminal at the top of the battery. In some embodiments the apertures are circular, although it should be understood that the apertures may be any geometric configuration and are not limited to circular shapes. In addition, it should be appreciated that the apertures of each layer are aligned so that access is provided through the layer stack. The embodiments of the stacked bus bars may be encased within a housing for use in a particular application, such as a hybrid or electric vehicle.

Figure 4:
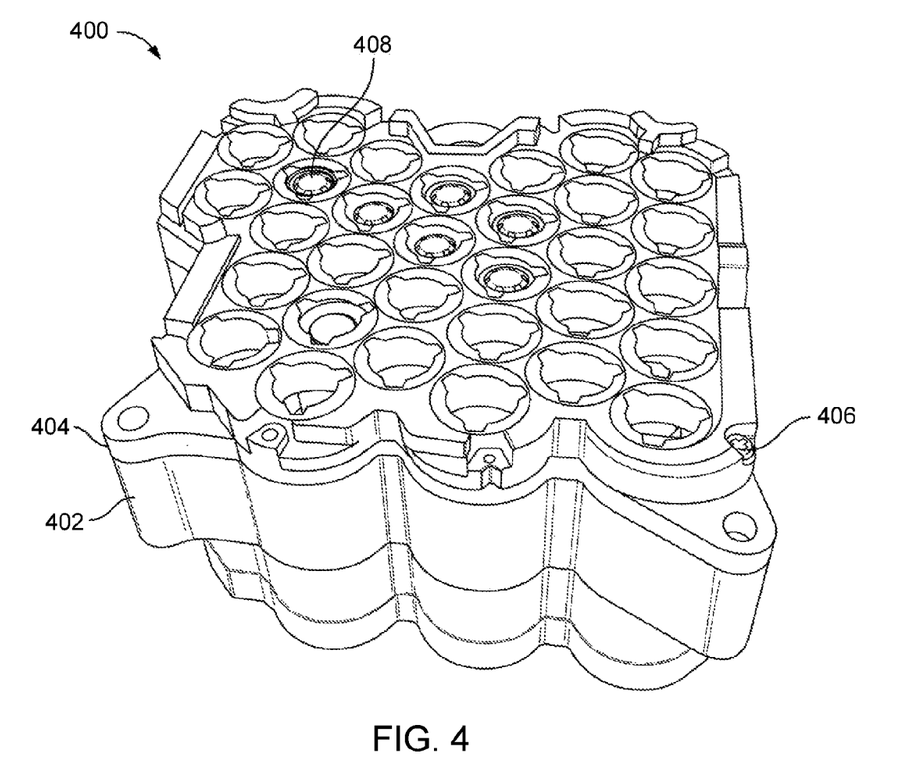
FIG. 4 is a perspective view of a battery holder applicable to the present invention.

FIG. 4 shows a battery cell holder 400. Battery holder 400, which may be molded, cast, printed using a 3D printer, or fabricated using an alternate technique, is preferably fabricated from plastic, although other materials may be used. Batteries 408 are inserted into lower housing member 402, after which upper housing member 404 is attached, for example using one or more fasteners 406 or other means. The battery holder 400 retains the battery cells in a close-packed or dense-packed, staggered row or hexagonal configuration, although other battery arrangements may be used. In the exemplary embodiment shown in FIG. 4, battery cell holder 400 is only partially populated. It will be appreciated that battery holder 400 can be used with chargeable or non-chargeable batteries of either a commercial or proprietary nature. Note that while battery cell holder 400 is shown without bus bars, preferably bus bars such as those described below are used with the holder.

Figure 5:
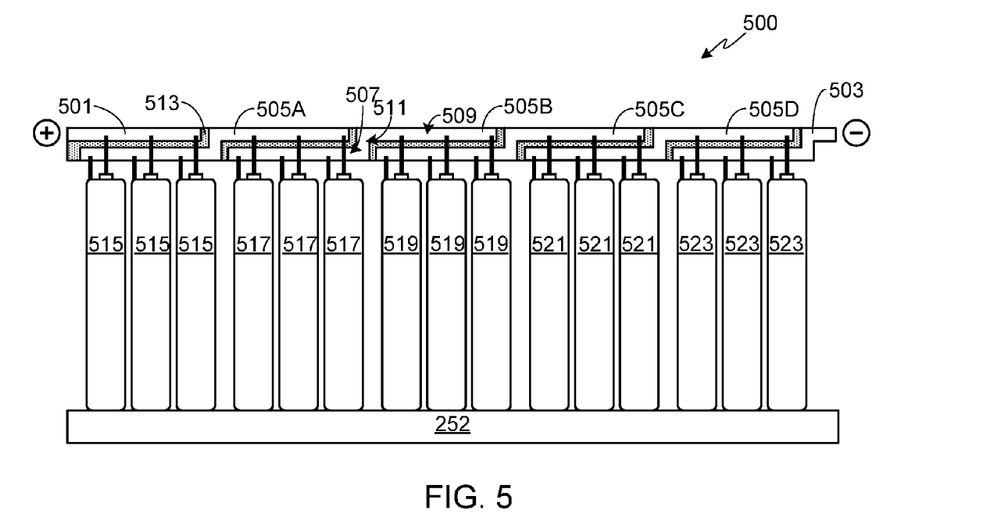
FIG. 5 is a schematic diagram of a battery pack similar to that shown in FIG. 2, utilizing a different bus bar configuration.

FIG. 5 provides a schematic illustration of an alternate bus bar configuration, similar to that shown in FIG. 2, modified to provide a compact and robust design. In the illustrated embodiment, the left-most bus bar 501 represents the positive terminal of the battery pack while the right-most bus bar 503 represents the negative terminal of the battery pack. In between the two output terminals 501 and 503 are a plurality of shaped bus bars 505A-505D. Note that the shaped bus bars are also referred to herein as "z-shaped" bus bars. Each shaped bus bar 505A-505D includes a lower segment 507 and an upper segment 509, where segments 507 and 509 are connected by a step segment 511 fabricated into the bus bar. The stepped feature integrated into each bus bar 505A-505D allows the bus bars to be stacked together, separated by an electrical insulator 513. In at least one embodiment, electrical insulator 513 is comprised of a layer of electrically insulating material deposited or otherwise applied to one or more outer bus bar surfaces.

In bus bar configuration 500, shown in FIG. 5, batteries 515 are connected in parallel such that each positive terminal of each battery 515 is coupled to output terminal 501 and each negative terminal of each battery 515 is coupled to the lower segment of bus bar 505A. Similarly, batteries 517 are connected in parallel such that each positive terminal of each battery 517 is coupled to the upper segment of bus bar 505A and each negative terminal of each battery 517 is coupled to the lower segment of bus bar 505B; batteries 519 are connected in parallel such that each positive terminal of each battery 519 is coupled to the upper segment of bus bar 505B and each negative terminal of each battery 519 is coupled to the lower segment of bus bar 505C; batteries 521 are connected in parallel such that each positive terminal of each battery 521 is coupled to the upper segment of bus bar 505C and each negative terminal of each battery 521 is coupled to the lower segment of bus bar 505D; and batteries 523 are connected in parallel such that each positive terminal of each battery 523 is coupled to the upper segment of bus bar 505D and each negative terminal of each battery 523 is coupled to the negative output terminal 503. Bus bar 505A serially connects batteries 515 to batteries 517; bus bar 505B serially connects batteries 517 to 519; bus bar 505C serially connects batteries 519 to 521; and bus bar 505D serially connects batteries 521 to batteries 523. It will be appreciated that other battery combinations may be used with the z-shaped bus bars of the invention, for example utilizing more batteries within each parallel connected battery group and/or more groups of batteries within the pack. As in the embodiment shown in FIG. 2, a thermal management system 252 (e.g., a heat sink or cooling conduits) is preferably coupled to the lower end portion of each of the batteries.

Figure 6:
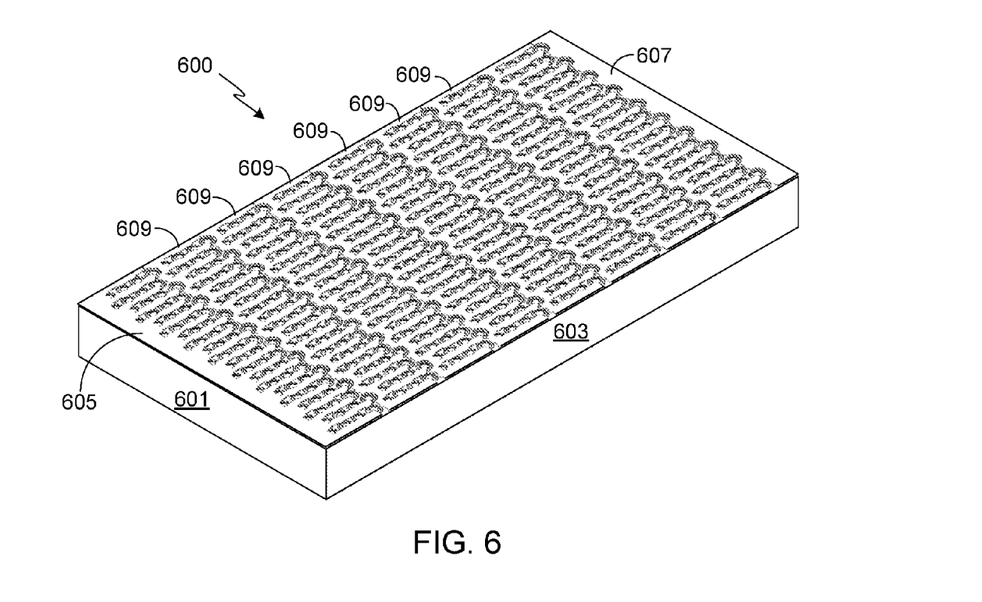
FIG. 6 provides a perspective view of a battery pack utilizing the z-shaped bus bar described relative to FIG. 5.

FIG. 6 provides a perspective view of a battery pack 600 utilizing the z-shaped bus bar described relative to FIG. 5. The batteries within battery pack 600 may be held in place using battery cell holder 400 or a similar battery holder. Note that due to the outer pack walls, two of which are shown in FIG. 6 (i.e., walls 601 and 603), the battery holder is not visible in this view. Bus bar 605 is only connected to one terminal, i.e., either the positive or negative terminal, of each of the underlying batteries in a manner similar to bus bar 501 in FIG. 5. Similarly, bus bar 607 is only connected to one terminal of each of the underlying batteries in a manner similar to bus bar 503. Accordingly, these two bus bars represent the output terminals of battery pack 600. Interposed between bus bars 605 and 607 are six bus bars 609, although a battery pack may be configured using either more or less bus bars 609. Each of the bus bars 609 use the z-shaped design described above and represented in FIG. 5 by bus bars 505A-505D.

Figure 7A:
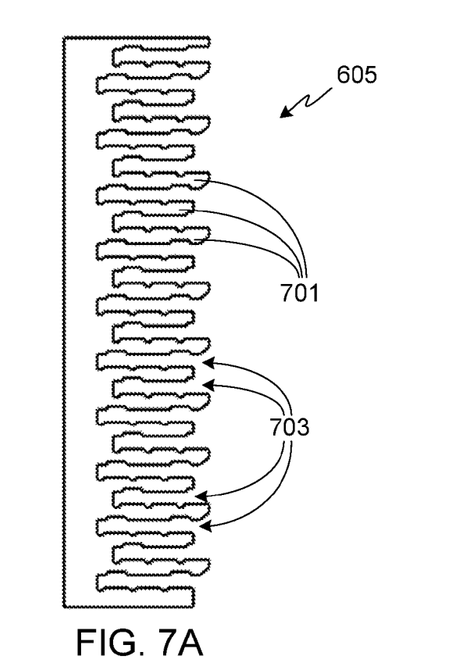
FIG. 7A provides a top view of the bus bar comprising the positive battery pack terminal of the battery pack shown in FIG. 6.
Figure 7B:
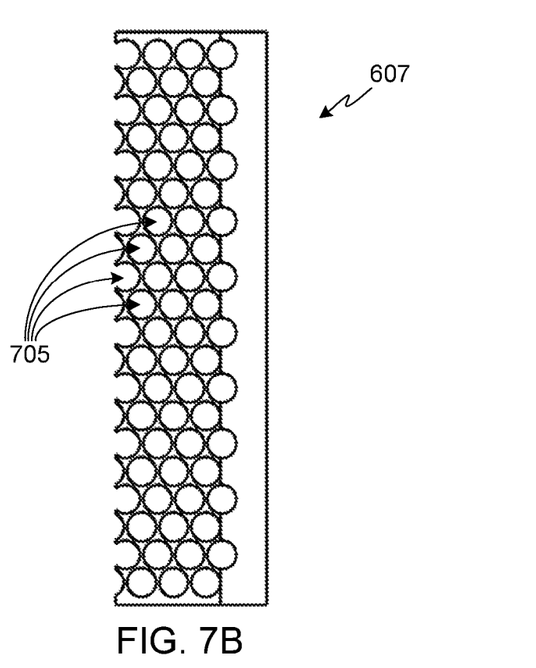
FIG. 7B provides a top view of the bus bar comprising the negative battery pack terminal of the battery pack shown in FIG. 6.
Figure 7C:
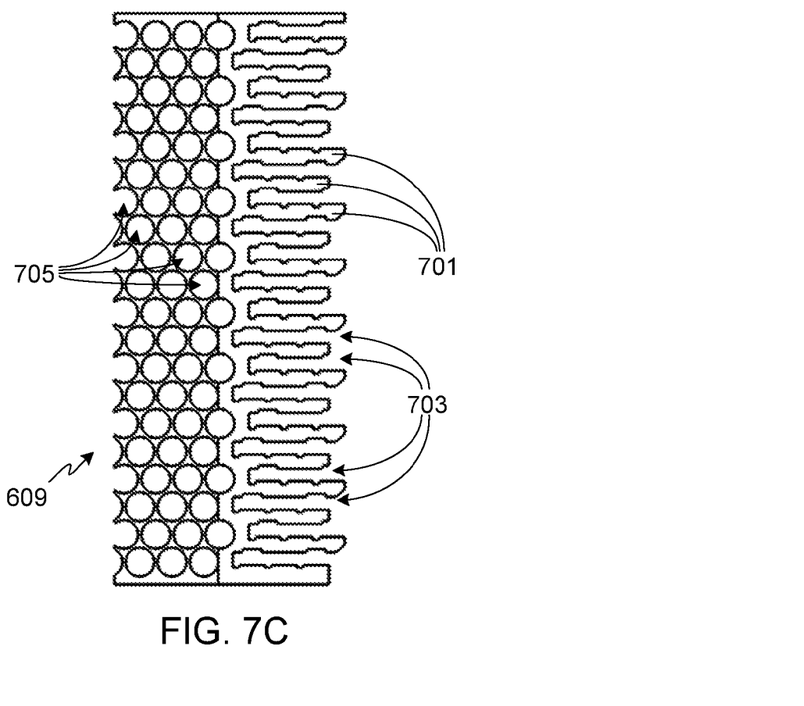
FIG. 7C provides a top view of the z-shaped bus bars used between the bus bar comprising the positive battery pack terminal and the bus bar comprising the negative battery pack terminal for the battery pack shown in FIG. 6.

As mentioned above, any of a variety of different aperture shapes and configurations may be used in order to allow wires to connect the bus bars to the battery terminals. In the preferred embodiment illustrated in FIG. 6, the bus bars use a combination of circular apertures and contact fingers to provide pathways for the connecting wires. FIGS. 7A-7C provide top views of bus bars 605, 607 and 609, respectively. Bus bars 605 and 609 each include a plurality of contact fingers 701. Interposed between the contact fingers 701 are open regions 703 which, as described and shown below, provide access to the underlying batteries so that contact wires, e.g., wire bonds, can be connected to both the batteries and the bus bars. Visible within bus bars 607 and 609 are a plurality of apertures 705, preferably circularly shaped to accommodate the end portion of a cylindrical battery, for example a battery utilizing the 18650 form factor. As previously noted, bus bars 605, 607 and 609 are fabricated from an electrically conductive material, preferably a metal. Although a separate layer of an electrically insulating material may be added to the stack to prevent the bus bars from shorting, in at least one embodiment at least a portion of at least one surface, preferably the lower surface, of each of the bus bars is coated with an electrically insulating material.

Figure 8:
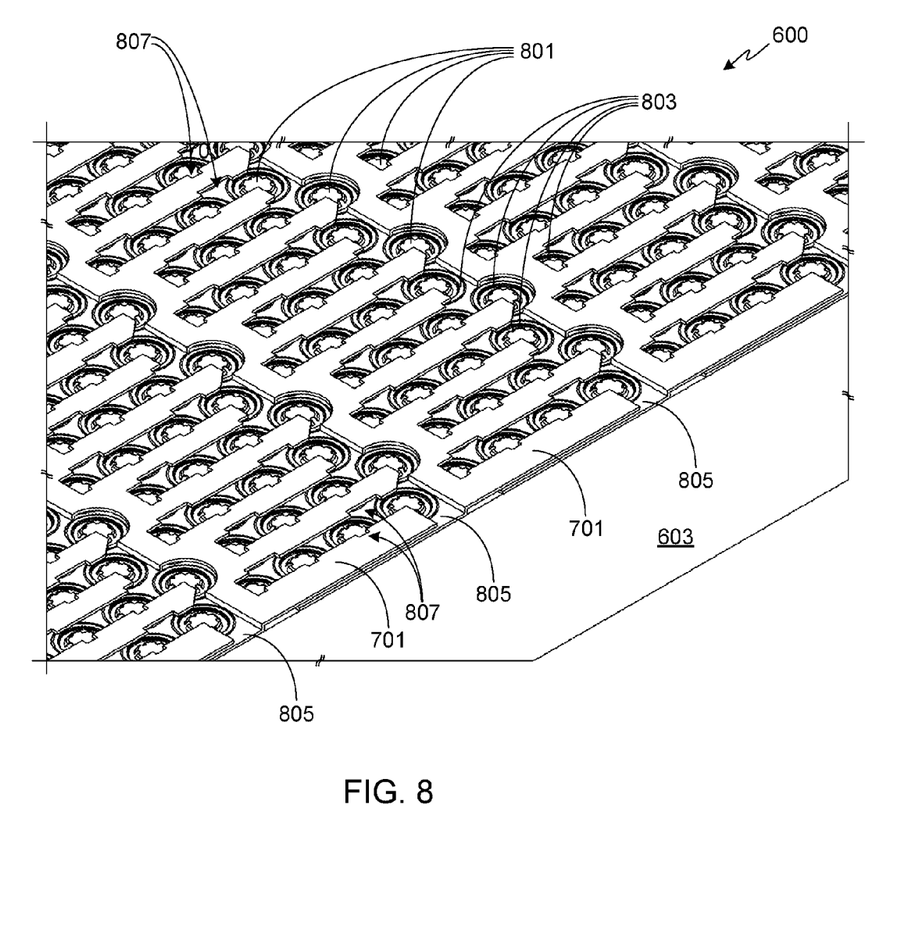
FIG. 8 provides a perspective, close-up view of the battery pack shown in FIG. 6.

FIG. 8 provides a perspective view of a portion of battery pack 600, this view providing additional detail. In this view both the top positive terminal 801 and the upper casing edge 803 of each of the batteries is visible, these portions of each of the batteries extending through apertures 705 in the lower segment 805 of bus bars 609. Note that in the preferred embodiment, each bus bar contact finger 701 comprising the upper segment of each bus bar 609 includes a plurality of cut-outs 807 that simplify attachment of the contact wires.

Figure 9:
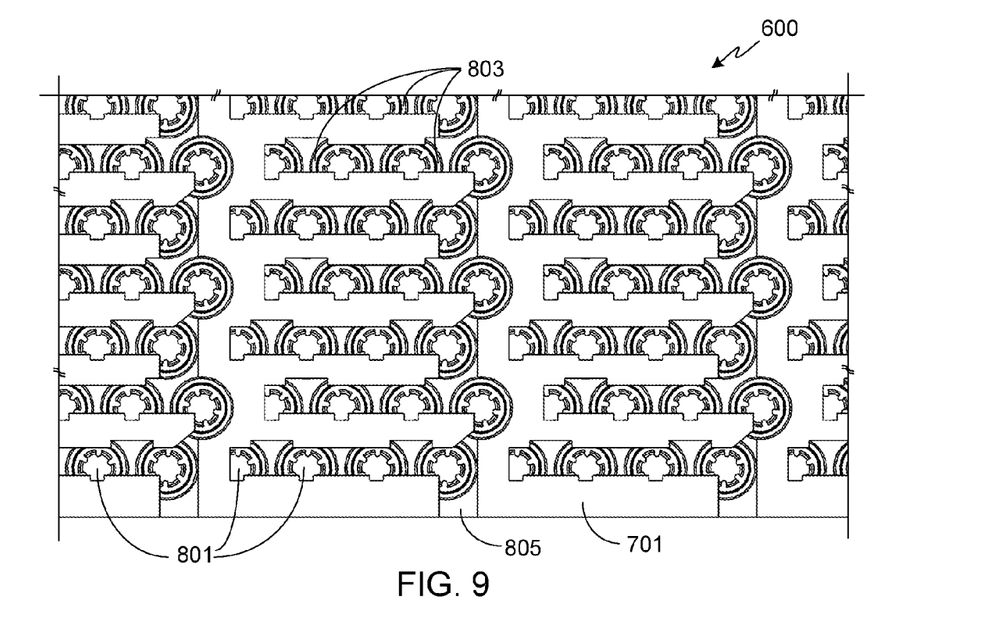
FIG. 9 provides a top view of a portion of the battery pack shown in FIGS. 6 and 8, this view providing additional details of the bus bar configuration.
Figure 10:
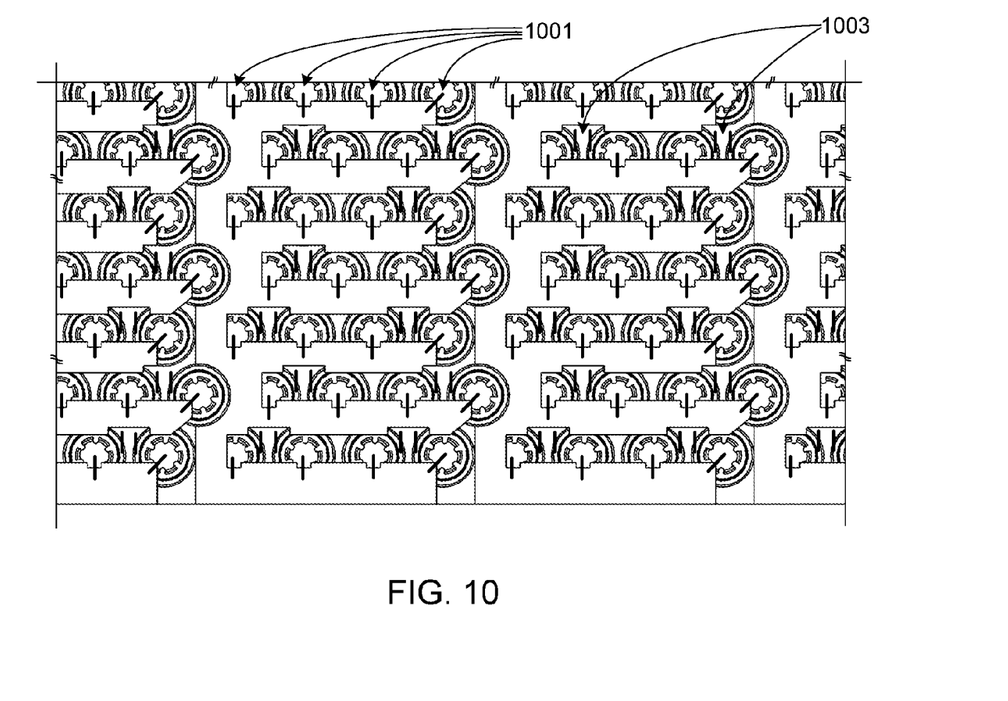
FIG. 10 provides the same top view as in FIG. 9, with the addition of wire bonds.

FIGS. 9 and 10 provide a top view of the same portion of battery pack 600. FIG. 10, however, includes wire bonds which couple the batteries to the bus bars. It will be appreciated that the contact wires may be attached using any wire bonding technique suitable for the selected wire gauge, wire material and bus bar material. Typical wire bonding techniques include, but are not limited to, ultrasonic bonding, resistance bonding, thermocompression bonding and thermosonic bonding. Clearly visible in FIG. 10 are the wire bonds 1001 that connect the positive terminal 801 of each battery to the upper segment (i.e., contact finger 701) of each z-shaped bus bar, and the wire bonds 1003 that connect each negative terminal (casing 803) of each battery to the lower segment (i.e., portion 805) of an adjacent z-shaped bus bar. It will be appreciated that, depending upon the design and configuration of the batteries within battery pack 600, the polarity of the battery casing and the battery nub may be reversed.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack, comprising:
a plurality of batteries, each battery of said plurality of batteries comprising a first terminal at a first end portion of said battery and a second terminal at said first end portion of said battery, wherein said plurality of batteries are divided into a plurality of rows, wherein each row of batteries is comprised of at least two batteries of said plurality of batteries, wherein said plurality of batteries are divided into a plurality of battery groups, wherein each battery group of said plurality of battery groups is comprised of at least two rows of said plurality of rows, wherein said batteries within each battery group are electrically connected in parallel, and wherein said battery groups of said plurality of battery groups are electrically connected in series;
a plurality of single-piece bus bars positioned proximate to said first end portion of each of said plurality of batteries, wherein each single-piece bus bar of said plurality of single-piece bus bars is comprised of an at least one upper bus bar segment, at least one lower bus bar segment and at least one step segment connecting said at least one upper bus bar segment to said at least one lower bus bar segment, wherein said upper bus bar segment of each single-piece bus bar of said plurality of single-piece bus bars is comprised of a plurality of contact fingers extending from said upper bus bar segment, wherein said lower bus bar segment of each single-piece bus bar of said plurality of single-piece bus bars is comprised of a plurality of apertures, wherein each single-piece bus bar of said plurality of single-piece bus bars is connected to said first terminal of each battery of a first battery group via said at least one upper bus bar segment and connected to said second terminal of each battery of a second battery group via said at least one lower bus bar segment, wherein said first battery group is adjacent to said second battery group; and a plurality of wire bonds that electrically connect said first terminal of each battery of each battery group of said plurality of battery groups to a corresponding contact finger of said plurality of contact fingers of a corresponding upper bus bar segment of a corresponding single-piece bus bar.

2. The battery pack of claim 1, wherein said plurality of single-piece bus bars are arranged in a repetitive sequence such that said upper bus bar segment of a first single-piece bus bar overlaps said lower bus bar segment of an adjacent single-piece bus bar, and wherein an electrically insulating layer is interposed between said upper bus bar segment of said first single-piece bus bar and said lower bus bar segment of said adjacent single-piece bus bar.

3. The battery pack of claim 2, wherein a first upper surface corresponding to said upper bus bar segment and a second upper surface corresponding to said lower bus bar segment are non-coplanar for each single-piece bus bar of said plurality of single-piece bus bars.

4. The battery pack of claim 2, wherein a first upper surface corresponding to said upper bus bar segment of said first single-piece bus bar is coplanar with a second upper surface corresponding to said upper bus bar segment of said adjacent single-piece bus bar.

5. The battery pack of claim 1, wherein each of said plurality of batteries is cylindrical, wherein said first terminal is comprised of a battery positive terminal, and wherein said second terminal is comprised of a battery casing.

6. The battery pack of claim 1, wherein said plurality of wire bonds are coupled to said first terminal of each battery of each battery group of said plurality of battery groups and to said corresponding contact finger of said plurality of contact fingers utilizing a bonding technique selected from the group consisting of ultrasonic bonding, resistance bonding, thermocompression bonding and thermosonic bonding.

7. The battery pack of claim 1, wherein each of said plurality of apertures is sized to accommodate said first end portion of a corresponding battery of said plurality of batteries.

8. The battery pack of claim 1, wherein each of said plurality of batteries is cylindrical, and wherein each of said plurality of apertures is circular.

9. The battery pack of claim 1, wherein each of said plurality of batteries utilizes an 18650 form factor, and wherein each of said plurality of apertures is circular.

10. The battery pack of claim 1, further comprising a plurality of wire bonds that electrically connect said second terminal of each battery of each battery group of said plurality of battery groups to a corresponding lower bus bar segment of a corresponding single-piece bus bar.

11. The battery pack of claim 10, wherein said plurality of wire bonds are coupled to said second terminal of each battery of each battery group of said plurality of battery groups and to said corresponding lower bus bar segment utilizing a bonding technique selected from the group consisting of ultrasonic bonding, resistance bonding, thermocompression bonding and thermosonic bonding.

12. The battery pack of claim 1, further comprising a first battery pack output terminal electrically connected to said first terminal of a first battery group of said plurality of battery groups, and a second battery pack output terminal electrically connected to said second terminal of a last battery group of said plurality of battery groups.

13. The battery pack of claim 1, further comprising a thermal management system thermally coupled to a second end portion of each battery of said plurality of batteries.

14. The battery pack of claim 13, said thermal management system comprising a heat sink.

15. The battery pack of claim 13, said thermal management system comprising a least one cooling conduit.

* * * * *